(12) United States Patent
Galasso (10) Patent No.: US 6,893,037 B1
(45) Date of Patent: May 17, 2005

(54) SUSPENSION ASSEMBLY FOR A VEHICLE

(76) Inventor: Mario Galasso, 825 Third Ave., 30th Floor, New York, NY (US) 10022-7519

( * ) Notice: Subject to any disclaimer, the term of this patent is extended or adjusted under 35 U.S.C. 154(b) by 0 days.

(21) Appl. No.: 10/086,186

(22) Filed: Feb. 26, 2002

Related U.S. Application Data (60) Provisional application No. 60/271,958, filed on Mar. 1, 2001.

(51) Int. Cl.[7] ............................................. B62K 25/08
(52) U.S. Cl. ..................................... 280/276; 280/279
(58) Field of Search ............................... 280/276, 275, 280/283, 284, 281.1, 274, 279

(56) References Cited

U.S. PATENT DOCUMENTS

| | | | |
|---|---|---|---|
| 704,901 A * | 7/1902 | Moore ......................... | 280/276 |
| 768,602 A * | 8/1904 | Haag ........................... | 72/285 |
| 937,614 A * | 10/1909 | Lampel ....................... | 280/276 |
| 4,531,755 A * | 7/1985 | Isono et al. ................. | 280/277 |
| 4,815,763 A * | 3/1989 | Hartmann .................... | 280/276 |
| 5,441,291 A * | 8/1995 | Girvin, III .................. | 280/276 |
| 5,478,099 A * | 12/1995 | Kawahara .................... | 280/276 |
| 5,511,811 A * | 4/1996 | Pileggi ........................ | 280/276 |
| 5,544,907 A * | 8/1996 | Lin et al. ................... | 280/288.3 |
| 5,553,880 A * | 9/1996 | McJunkin et al. .......... | 280/283 |
| 6,244,609 B1 * | 6/2001 | Wilson ........................ | 280/276 |

* cited by examiner

Primary Examiner—Anne Marie Boehler
(74) Attorney, Agent, or Firm—Evelyn M. Sommer (57) ABSTRACT

An improved telescopic front suspension system is disclosed for use with vehicles having a front wheel, such as bicycles and motorcycles. The assembly includes a steering tube mounted in a head tube of the vehicle frame and connected to a stem and handlebar above the head tube and to a fork crown below the head tube. The crown is attached to a pair of stanchions which slide axially inside of a pair of sliders mounted to each side of the axle for the front wheel. The stanchions and sliders have a cross-sectional shape that is a non-round, smooth curve, such as an ellipse. The upper end of the sliders provides a mounting for an external bushing whose inner shape matches the outer shape of the stanchions. The lower end of the stanchions provides a mounting for an internal bushing whose outer shape matches the inner shape of the sliders. The bushing arrangement and non-round, smooth shape of the stanchions and sliders allow them to freely telescope while preventing rotation between the parts, which may otherwise occur due to steering loads and bump impacts at an angle to the front wheel. Preventing rotation of the parts relative to each other results in more precise steering control for the rider.

14 Claims, 12 Drawing Sheets

SUSPENSION ASSEMBLY FOR A VEHICLE

PRIORITY CLAIM

A claim is hereby made to the priority of U.S. Provisional Application 60/271,958, filed on Mar. 1, 2001, entitled "Suspension Assembly For A Vehicle", of the same inventor.

FIELD OF THE INVENTION

The field of the present invention relates to suspension systems and more particularly to a suspension assembly for vehicles such as bicycles and motorcycles.

BACKGROUND OF THE INVENTION

Various forms of suspension systems have been developed for use on bicycle and motorcycles. The most common form is a front fork utilizing two telescoping assemblies positioned on either side of the front wheel. Front suspension is beneficial to the rider because it can improve handling and control as the suspension helps the front wheel follow the ground and provides isolation from the irregularities of the terrain. Typically the two telescoping assemblies are comprised of round inner and outer tubes in communication with one another through round cross section bushings. The inner tubes may be either the upper set of tubes, the stanchions, or the lower set of tubes, the sliders, depending on the design and application. In either case, the upper end of the stanchions is connected to one, or two fork crowns. Typically a bicycle has one fork crown below the head tube of the vehicle frame and a motorcycle will have a fork crown below and a fork crown above the head tube of the vehicle frame. A steer tube is connected to the crown that is below the head tube of the frame and extends up and through the head tube. The steer tube is supported at the bottom of the head and at the top of the head tube with bearings whose internal diameter is slightly larger than the outside diameter of the steer tube and whose outside diameter is a press fit into prepared features in the top and bottom of the head tube. The top of the steer tube is connected to the handlebar assembly of the vehicle directly on a bicycle. On a motorcycle the top of the steer tube typically is mounted to the upper fork crown, which comprises part of the handlebar assembly. The stanchions extend from the lower fork crown down towards the ground and terminate a distance below the fork crown and above the front axle of the fork. The sliders provide front wheel axle mounting at their lower ends and extend upwards from the axle. Debris is kept out of the telescoping assemblies by use of wipers while damping and lubrication fluid is contained within the telescoping assemblies by use of oil seals. These wipers and seals are fixed to the upper end of the sliders. A spring and damper system are contained within the telescoping assemblies to create a system that provides the benefits of better handling and control. The oil seal system allows for a variety of spring damper designs to be utilized within the telescoping assemblies. However, when a suspension fork of this design is loaded torsionally, which happens during steering and when hitting bumps at an angle, the sliders can rotate relative to the stanchions due to the round cross section's inability to resist torsional loads. With round tubes the only torque that can be transferred from the slider to the stanchion is the amount developed through friction between the fork bushings and the tubes they support. This interface is made to be very slippery so that motion from terrain irregularities can be easily accommodated. The amount of torque transmission then is negligible. This torsional rotation results in increased perceived fork flex and can cause a lack of control due to the imprecise feeling to the rider.

A less common approach to a telescopic front suspension system uses non-round tubes for the telescoping assembly to create the ability to transfer torque from one tube to the other. One such design utilizes an inner tube with a plurality of flats making up its outside shape. An outer tube is positioned coaxially and telescopically to the inner tube and has a corresponding number of flats making up its inside shape. The flats communicate with one another via cylindrical needle bearings, which roll on the flats when the inner and outer tubes are moved relative to one another. A system like this can transmit torque as well as telescope. However, due to the flat sections on the outside of the inner tube a typical oil seal and wiper arrangement cannot be used. This system uses a flexible bellows to keep debris from entering the telescoping assembly. The bellows can tear and is not watertight so contamination is a common problem with a system like this. Also, since oil can not be sealed well by this bellows, only a self contained cartridge damper system can be utilized within this system, which limits the its performance potential.

Other approaches to the torque transferring telescoping assembly have been to employ grooves on the inside diameter of the outer tube with corresponding grooves on the outside diameter of the inner tube. The grooves in this case communicate via loose balls bearings.

Additionally there are linkage type systems, which provide a scissor linkage similar to the landing gear of an airplane. One end of the linkage is connected to the outer tube. The other end of the linkage is connected to the inner tube. The linkage can fold when the suspension goes through its travel but it does not allow the inner and outer tube to rotate relative to one another.

All of these torque-transferring telescoping suspension systems contain more parts and are more expensive to produce than the bushing style round tube system described above.

SUMMARY OF THE INVENTION

The present invention provides for an improved suspension system in the form of a telescoping fork assembly for bicycles. The assembly is comprised of a steering tube, which is mounted in and extends through the head tube of the vehicle frame. The steering tube is connected to the stem and handlebar assembly above the head tube and is connected to a fork crown below the head tube. The steer tube is supported at the bottom of the head and at the top of the head tube with bearings whose internal diameter is slightly larger than the outside diameter of the steer tube and whose outside diameter is a press fit into prepared features in the top and bottom of the head tube. The steer tube interface is such that it cannot rotate relative to the stem and crown it is connected to. The crown attaches to a pair of inner tubes called stanchions, which are positioned on either side of the front wheel, and extend towards the ground. The stanchions are connected in such a way that they have zero degrees of freedom relative to the crown. The stanchion external shape is generally elliptical. A sliding assembly with two outer tubes called sliders is coaxially and telescopically arranged to the stanchions. The lower end of the slider tubes receives the front wheel of the vehicle. The upper end of the slider tubes provides mounting for a scraper and oil seal, as well as a bushing whose internal shape matches the external shape of the stanchion. The scraper prevents debris from entering the telescoping assemblies and the oil seal prevents damping and lubrication fluid from exiting the telescoping assemblies. The lower end of the stanchion tube contains mounting for a bushing whose external shape matches the internal shape of the slider tubes, which is also generally elliptical. The interface between the external shapes of the stanchion tubes, the internal shape of the slider tubes, and the bushings is such that friction is greatly reduced providing smooth sliding action of the telescoping assemblies while transmitting loads from the outer tubes to the inner tubes due to their generally elliptical shape. A fork bridge attaches to the upper end of both slider tubes so that axial displacement remains the same between the right and left sliders.

Spring and damper systems will be contained within the telescoping assemblies and mounted to the upper end of the stanchion and the lower end of the slider such that relative motion of the telescoping assemblies will result in corresponding movement of the spring and damper system. This motion results in the compression and extension of the system spring and the relative motion of the damper piston through the damping fluid, thereby providing oscillatory control of the terrain irregularities and stored system spring energy.

Preventing rotation between the stanchion tubes and the slider tubes greatly reduces the perceived flex due to steering loads and bump loads encountered at an angle to the front wheel. This results in a more precise handling front end of the vehicle. Furthermore, since the invention provides for a suspension assembly that both telescopes and transmits torque, it can be seen that one telescoping assembly could be utilized as a strut beside the vehicle front wheel, instead of a fork on both sides of the vehicle front wheel, or it can provide a telescoping strut contained within the head tube of the vehicle frame and attached to a rigid fork at its' lower end.

It is obvious to those skilled in the art that the disclosed invention can also be readily utilized for a motorcycle suspension fork, bicycle suspension seat post, or airplane landing gear.

DETAILED DESCRIPTION OF THE PREFERRED EMBODIMENT

Figure 1:
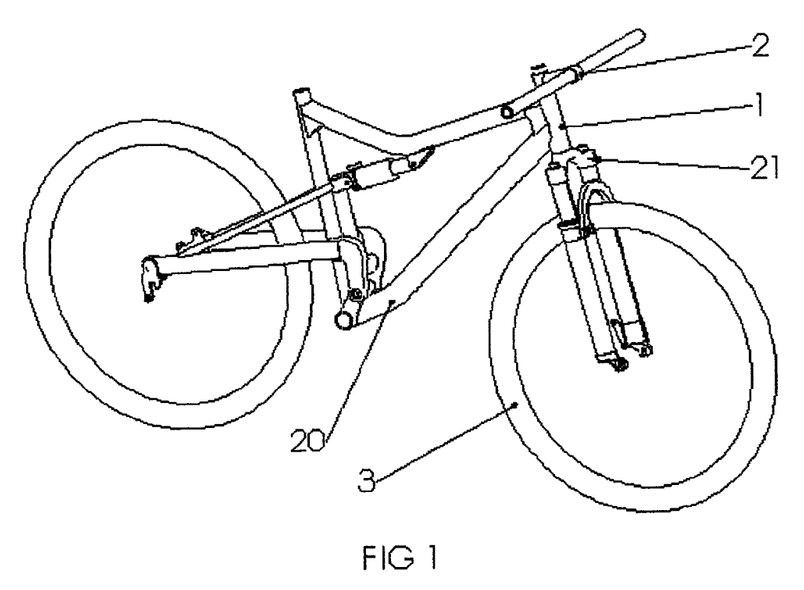
FIG. 1 illustrates the placement of the invention into a bicycle frame.

In FIG. 1, a bicycle frame 20 is shown along with a head tube 11. The steer tube 4 in FIG. 2 of the fork assembly 21 is inserted upwards into the head tube 11 and attaches to the handlebar assembly 2. The steer tube 4 is supported within the head tube 11 by bearings (not shown) inserted into features prepared in the top and bottom of the head tube 11. When the handlebar assembly 2 is in place and tightened to the steer tube 4 there is no relative movement provided between the two parts. This mating retains the steer tube 4 axially within the head tube 11 while the bearings allow for steering rotation. The front wheel 3 is mounted to the dropouts 13–14 of FIG. 2 and is steer-ably connected to the handlebar assembly 2 via the fork assembly 21 as will become apparent.

Figure 2:
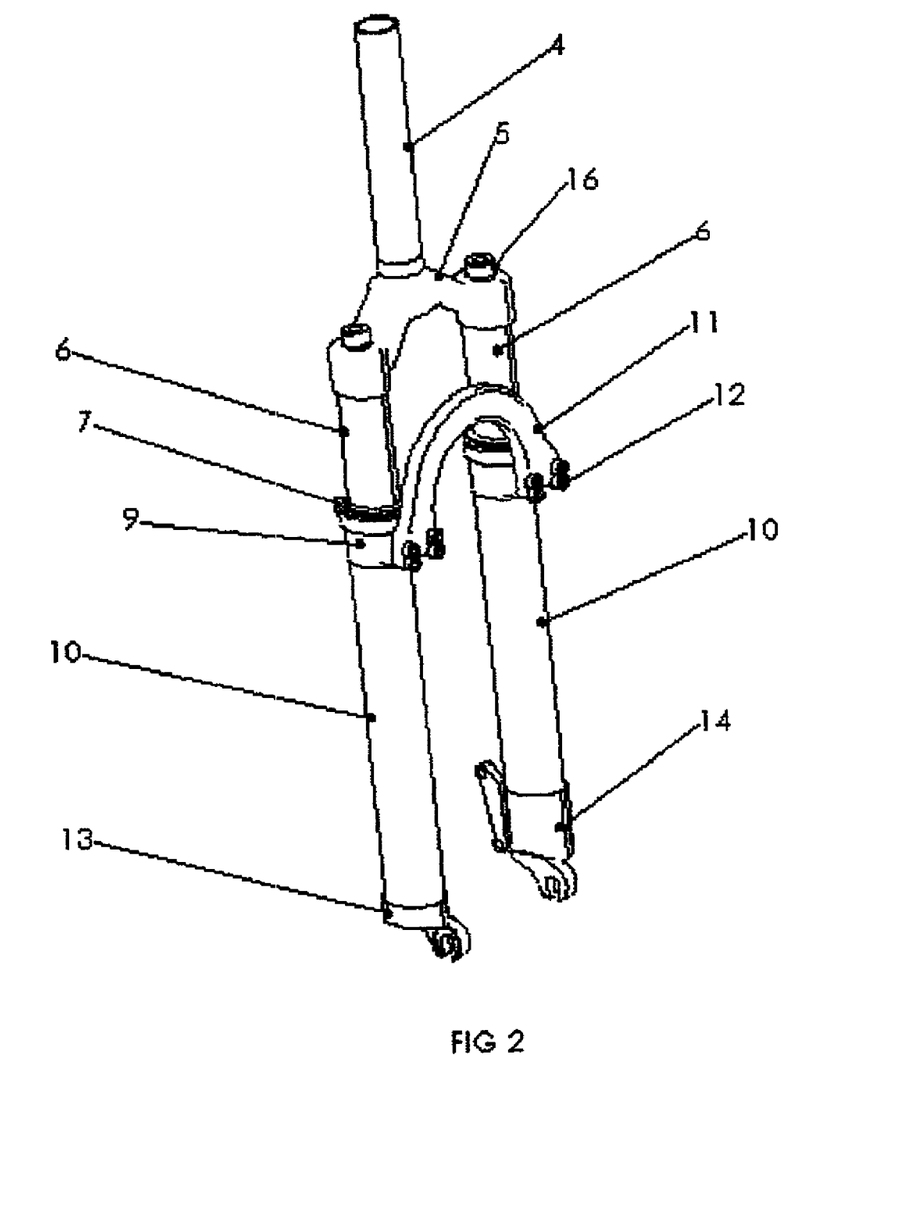
FIG. 2 illustrates the preferred embodiment of the invention.

Referring to FIG. 2, the steer tube 4 is cylindrical in shape and is attached at its' lower end to the crown 5 via a press, or interference fit, between the outside diameter of the steer tube 4 lower end and a bore prepared in the crown 5.

The bosses at the right and left extremities of the crown 5 are prepared internally to accept the stanchions 6. The stanchion 6 outside shape is generally elliptical, though it will become obvious that the stanchion can be any shape other than round, which does not contain flat sections or keying elements. Therefore the internal preparation of the bosses of crown 5 match the shape of the stanchion 6 less at least 0.001 inches to create a profile interference fit.

The sliders 10 are also elliptical on their internal shape to closely match the outside shape of the stanchion 6. The outside shape of the slider 10 is also elliptical, as a constant wall thickness will yield the lightest construction. The bushing carrier 9 is attached to the upper end of the slider 10. The bushing carrier 9 has an elliptical feature internally prepared at its' lower end to accept the slider 10. This internal feature creates a profile interference fit between the slider 10 and the bushing carrier 9 of at least 0.001 inches. This causes the busing carrier 9 to essentially be permanently attached to the slider 10 when the bushing carrier 9 is pressed onto the slider 10 to a definitive stop created by a shoulder at the end of the interference fit feature in the bushing carrier 9.

The right dropout 13 and left dropout 14 are attached to the lower end of the slider 10. Both the right dropout 13 and the left dropout 14 have internal features prepared to accept the sliders 10. These internal features are prepared such that a profile interference fit of at least 0.001 inches exists between the outside shape of the sliders 10 and the internal shape of the interference fit features within the right dropout 13 and left dropout 14. When pressed onto the sliders 10 to a definitive stop at the bottom of the interference fit features within the right and left dropouts 13–14, the right dropout 13 and left dropout 14 are permanently attached to the sliders 10.

The bushing carriers 9 have bosses with threaded holes prepared on their forward side. These holes are used to mount the fork bridge 11 to the right slider assembly 22 and left slider assembly 23. There are through holes prepared in the fork bridge 11, which receive the fork bridge bolts 12. The fork bridge 11 through holes match up coaxially with the threaded holes prepared in the bosses of the bushing carriers 9. There are 4 fork bridge bolts 12 shown for mounting to each of the right slider assembly 22 and the left slider assembly 23. At least 2 fork bridge bolts 12 are required per mounting location, or 1 fork bridge bolt 12 and a mechanical interface between the bushing carriers 9 and the fork bridge 11 to provide a joint such that the fork bridge 11 can not rotate relative to the bushing carriers 9.

Figure 4:
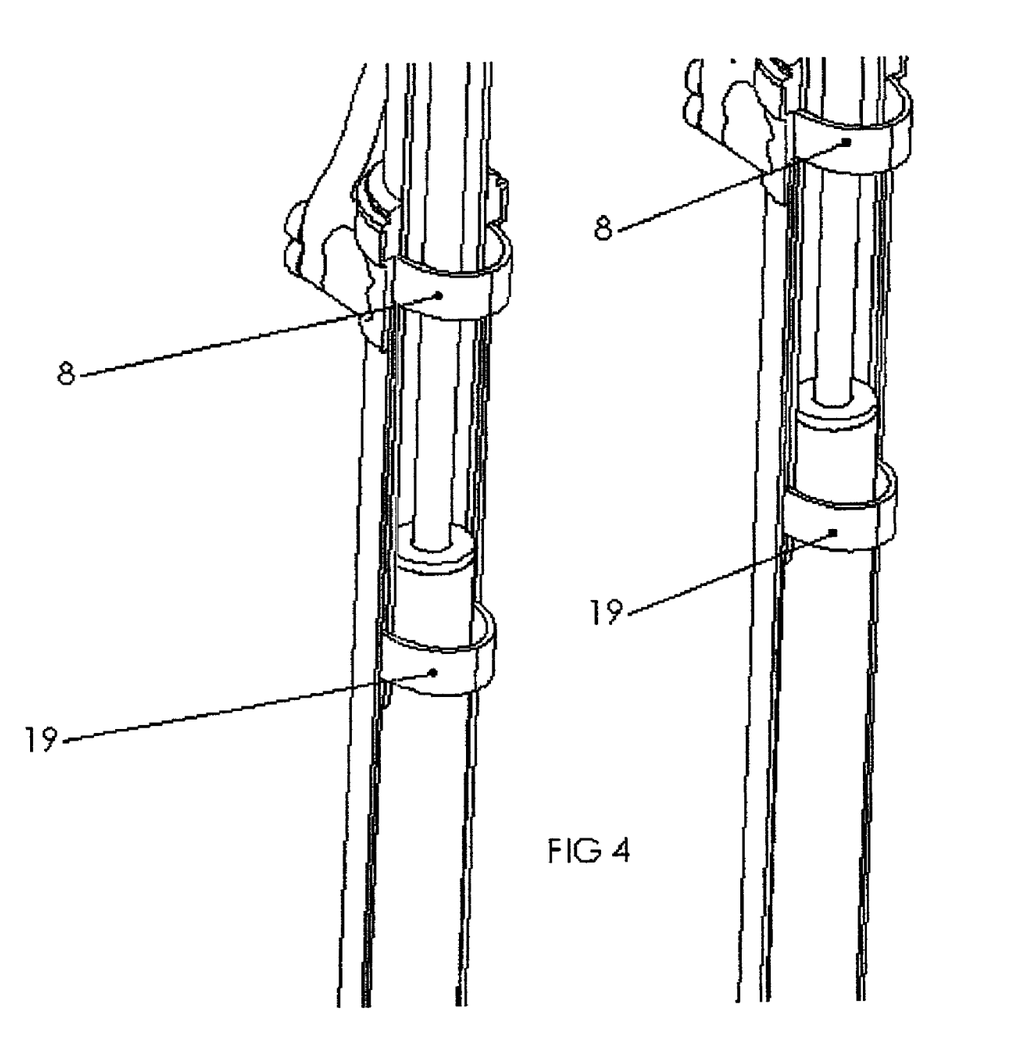
FIG. 4 is a partial cut away view illustrating the placement of the fork assembly bushings.

The bushing carrier 9 has a second, elliptical, internal feature above the slider 10 to bushing carrier 9 interference fit feature. This second feature houses the upper bushing 8, shown in FIG. 4. The upper bushing 8 is a composite of steel, sintered bronze, polytetraflourethylene, and lead. The steel comprises the outside of the upper busing 8 and interfaces with the second internal feature of the bushing carrier 9. The shape of the external steel backing is elliptical and matches the shape of the second internal feature of the bushing carrier 9 exactly, up to approximately 0.001 inches interference. This fit will provide enough retaining force between the bushing carrier 9 and the upper bushing 8 to keep the upper bushing 8 in place during use of the fork assembly 21. The sintered bronze, polytetraflouroethylene, and lead combine to provide a low friction interface between the outside shape of the stanchions 6, which are aluminum and hard anodized, and the inside shape of the upper bushings 8. The use of bushings requires a gap between the mating surfaces. It has been found that a gap of approximately 0.0005–0.0035 inches between the outside shape of the stanchion 6 and the inside shape of the upper bushing 8 yields the desired performance. It has also been found that a composite bushing made up of these materials yields the best performance though it is possible to utilize any bushing capable of producing the required low friction interface between the stanchion 6 and the upper bushing 8.

Figure 9:
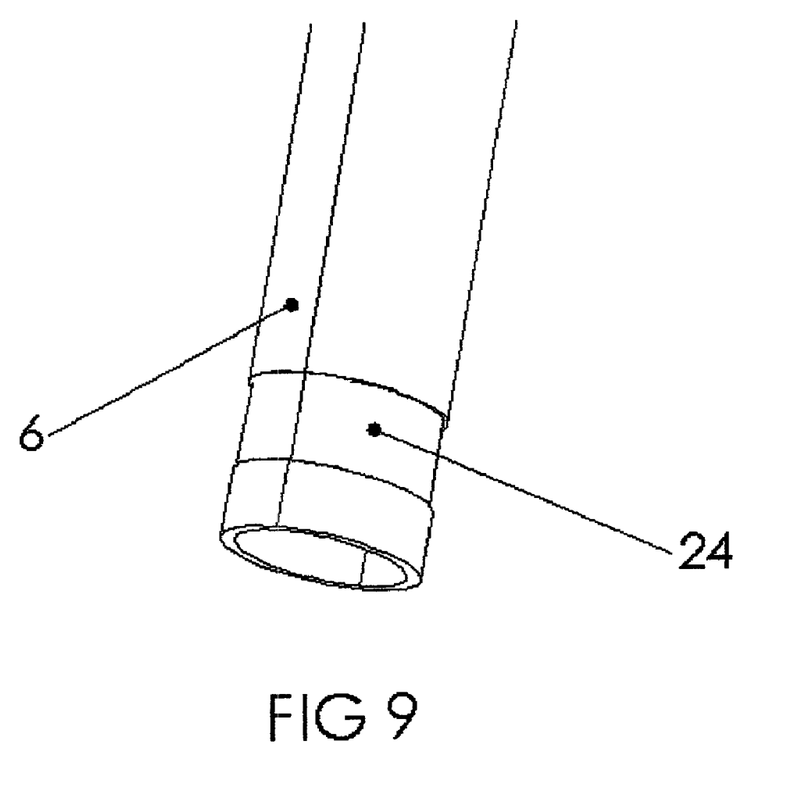
FIG. 9 provides a close up view of the bushing fit feature at the bottom end of the stanchions.
Figure 10:
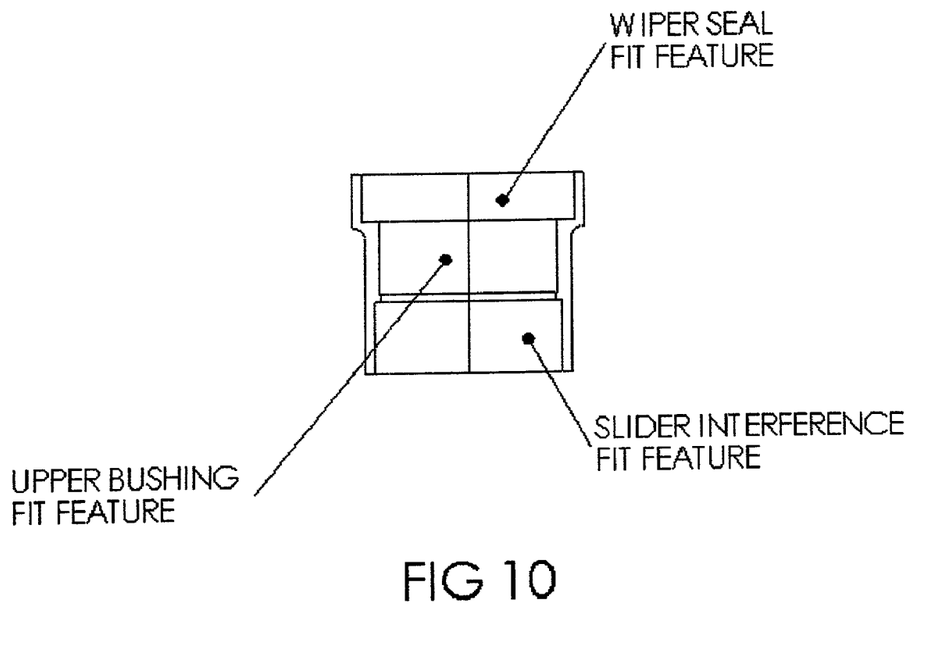
FIG. 10 provides a cross section view of the bushing carrier.

At approximately 0.375 inches from the lower end of the stanchions 6 is cut 24 of uniform depth prepared in the outside shape of the stanchion 6. The depth of this slot is approximately 0.020 inches and is approximately 0.505 inches wide. A second set of lower bushings 19 of the same composite construction and approximately 0.500 inches in width is disposed in this slot. The lower bushing 19 differs from the upper bushing 8 in that the steel backing is now on the inside profile of the bushing and the low friction interface material is on the outside profile of the bushing. The outside shape of the lower bushing 19 is sized such that the same gap of 0.0005–0.0035 inches is maintained between the inside shape of the sliders 10 and the outside shape for the lower bushings 19. The inside steel backing is approximately the same dimensions as the base of cut 24 in the end of the stanchions 6. By arranging the bushings for the fork assembly 21 in this manner the distance between the upper bushing 8 and lower bushing 19 will increase as the fork is telescopically displaced. Increasing the distance between the upper brushing 8 and lower bushing 19 decreases the lever arm distance, or moment, between the front wheel 3 mounting and the lower bushing 19, making for a stronger structure than if the lower bushing 19 were of similar construction to the upper bushing 8 and fixed to the slider 6 a fixed axial distance away from the upper bushing 8.

Figure 8:
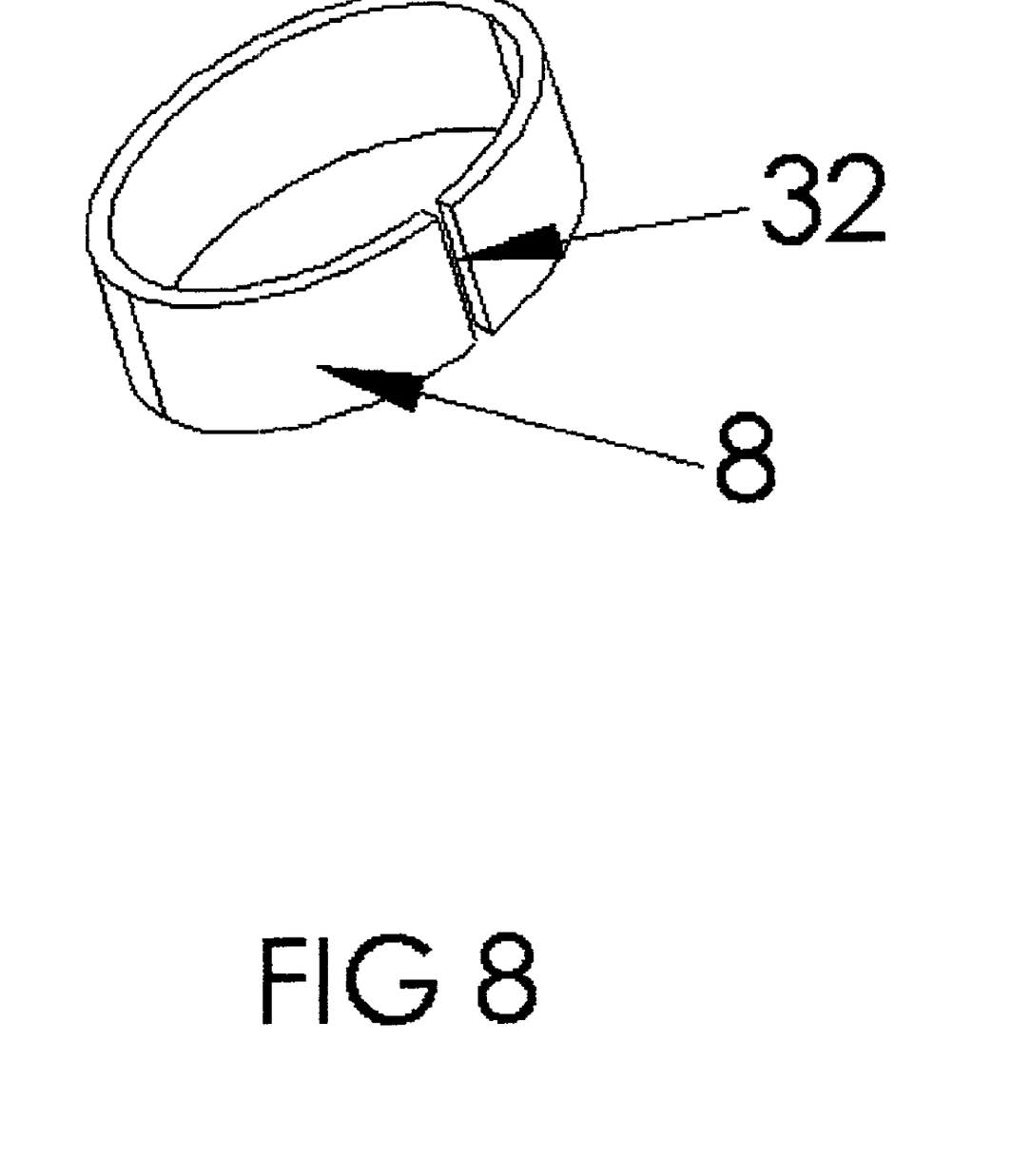
FIG. 8 illustrates the slot provided in the fork assembly bushings.

As shown in FIG. 8, the upper bushings 8 and the lower bushings 19 have a slot 32 cut through their thickness such that their manufacturing tolerances can be relaxed and ease of assembly is provided. The upper bushings 8 and lower bushings 19 take their final shape when they are placed within their intended housing.

Figure 3:
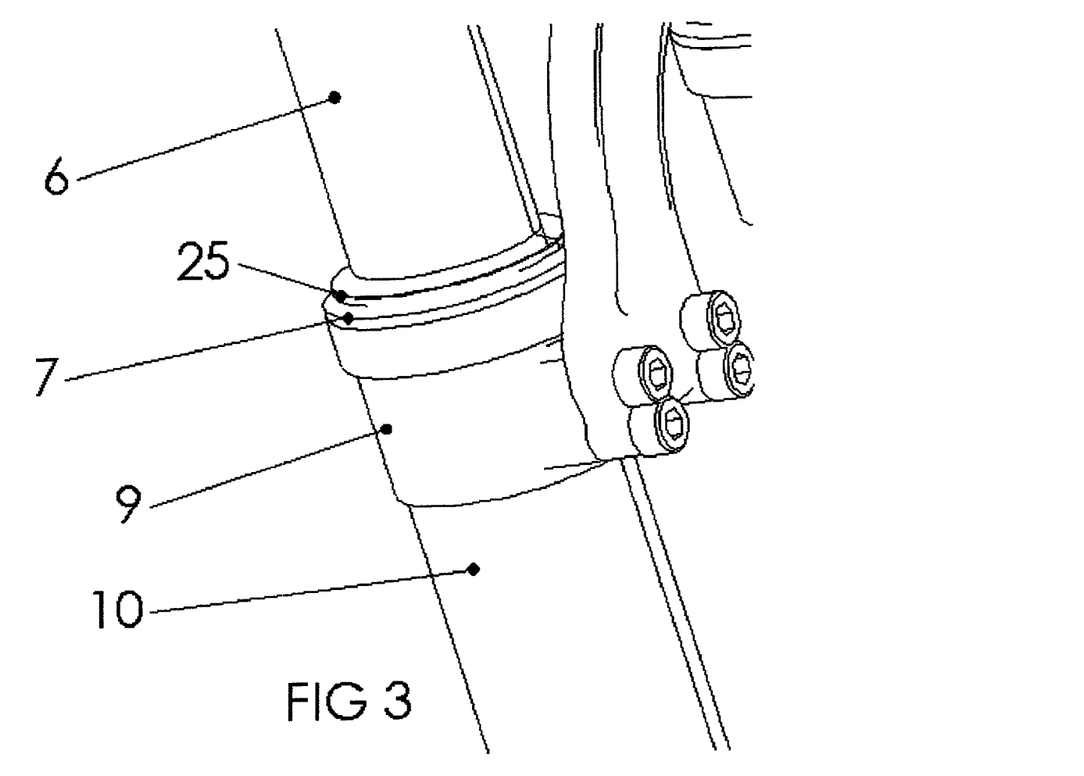
FIG. 3 provides a close up view of the integral dirt wiper and oil seal.

A third, elliptical, internal feature is prepared at the top of the bushing carrier 9. The wiper seal 7 of FIG. 3 is housed within this third feature. The wiper seal 7 is made of rubber construction and is comprised of oil sealing features on its' lower end and dirt sealing features on its' upper end, both of which are in sealing contact with the outside surface of the stanchion 6. The oil seal portion of the wiper seals 7 is designed to keep the damping and lubrication fluid inside the fork assembly 21. The dirt seal feature of the wiper seal 7 is designed to keep dirt and debris from entering the fork assembly 21, which would compromise the low friction interface surfaces and degrade the performance of the fork assembly 21. The oil seal portion of the wiper seal 7 is contained within the housing created by the third internal feature of the bushing carrier 9. The dirt seal portion of the wiper seal 7 is positioned above the last feature of the bushing carrier 8 and so it has a feature designed to except the external wiper seal spring 25 to provide spring loaded backing force to ensure that proper sealing contact is maintained between the outside surface of the stanchion 6 and the dirt seal features of the wiper seal 7.

Figure 5:
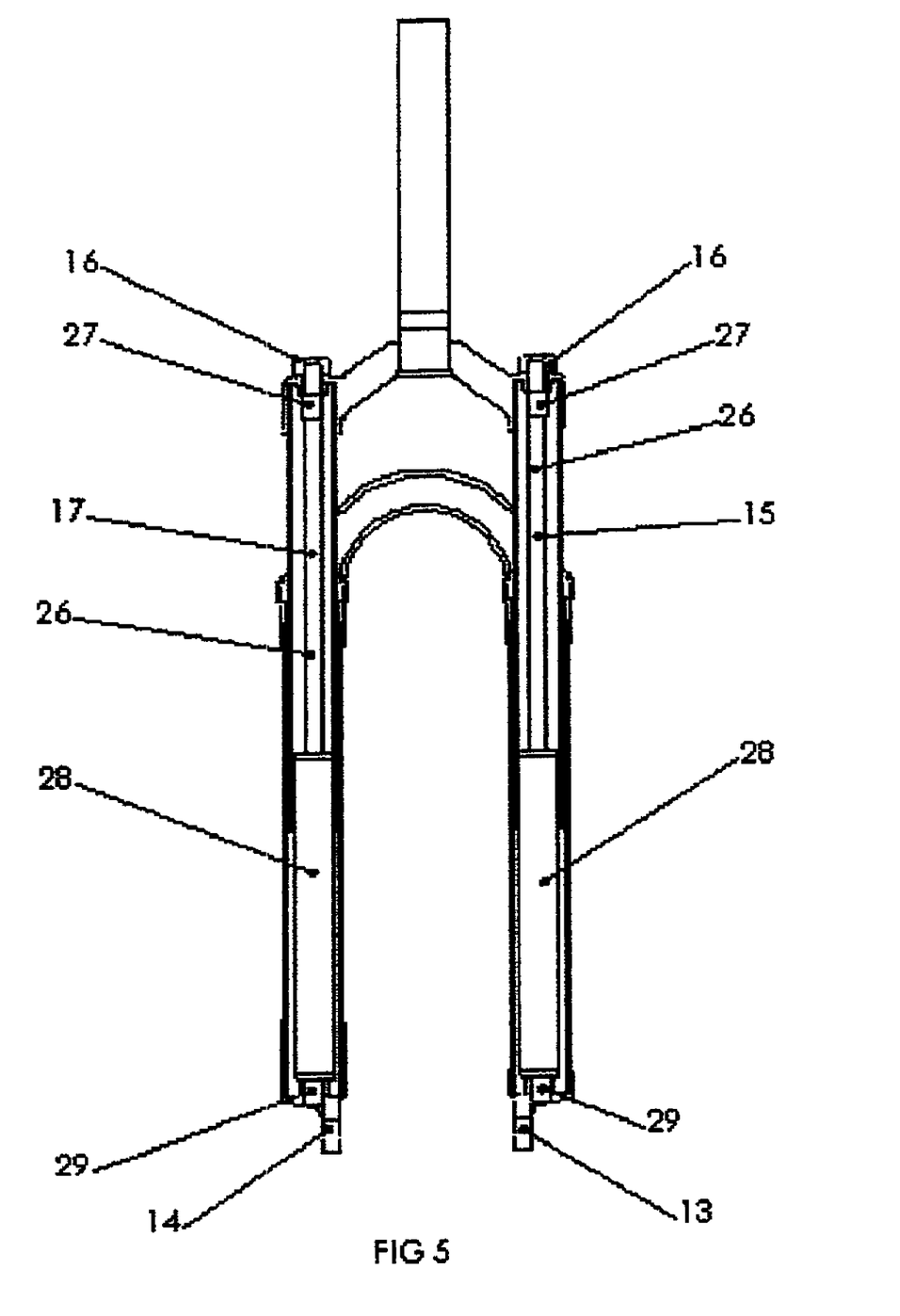
FIG. 5 is a cut away view illustrating the placement of the spring and damper assemblies within the fork telescoping assemblies.

Referring to FIG. 5 shows a damper assembly 15 and spring assembly 17 positioned within the fork assembly 21. The damper assembly 15 is disposed within the right side of the fork structure 21 and the spring assembly 17 is disposed within the left side of the fork structure 21. This relationship is not important and could be reversed if desired. The spring and damper could also be designed to be of integral construction with one disposed in the right side of the fork assembly 21 and one disposed in the left side of the fork assembly 21. In any event, it is only important that at least one spring and at least one damper be coaxially and telescopically disposed within the fork assembly 21. The spring assembly 17 is intended to bias the slider 10 portion of the fork away from the stanchion 6 portion of the fork. The spring assembly 17 supports the weight of the rider and vehicle and will be compressed whenever the fork assembly 21 is telescopically displaced due to terrain irregularities or weight transfer loading. After the spring assembly 17 has been compressed it will rebound to its' original position, also rebounding the fork assembly 21 to its' original position. The spring assembly 17 will be comprised of an air spring; though the air spring could be replaced by common coil wound compression springs or elastomeric compression springs. The damper assembly 15 will be telescopically compressed and rebounded as the fork structure 21 telescopes to react to terrain changes and weight transfer loading. The damper assembly 15 contains a piston, which is forced through damping fluid at the same rate that the fork assembly 21 is being compressed or rebounded. This action dissipates the bump energy on fork assembly 21 compression and dissipates stored spring energy on fork assembly 21 rebound and converts this energy to heat. It is obvious to those skilled in the art that that the fork assembly 21 structure does not limit the damper design to any particular type and can take the form of twin tube, mono tube, open bath, or friction type dampers.

Figure 6:
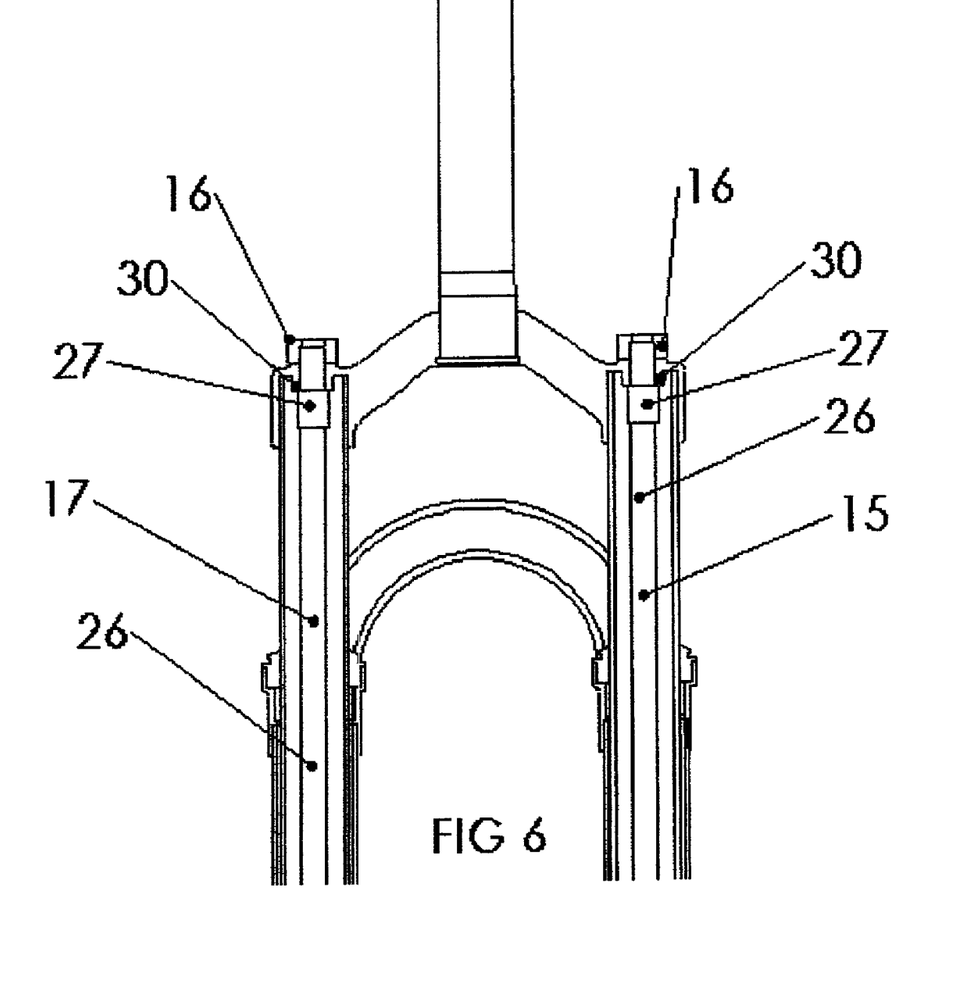
FIG. 6 illustrates the mounting provisions for attaching the spring and damper assemblies top the fork crown.

FIG. 6 shows the attachment of the damper assembly 15 and the spring assembly 17 to the crown 5. A damper/spring shaft extension 27 extends coaxially up through the hole in mounting boss 30 in the crown 5. A shoulder on the shaft extension 27 of the damper assembly 15 and the spring assembly 17 contacts and stops at the bottom surface of mounting boss 30 on the crown 5. An externally threaded portion of the shaft extension 27 protrudes through the top surface of the crown 5 and is engaged by the damper/spring fixing nut 16. The spring/damper fixing nut 16 is threaded onto the protruding portion of the shaft extension 27 with the bottom surface of the damper/spring fixing nut 16 contacting the top of the crown 5 holding the damper/spring shaft 26 shaft fixed to the crown 5.

Figure 7:
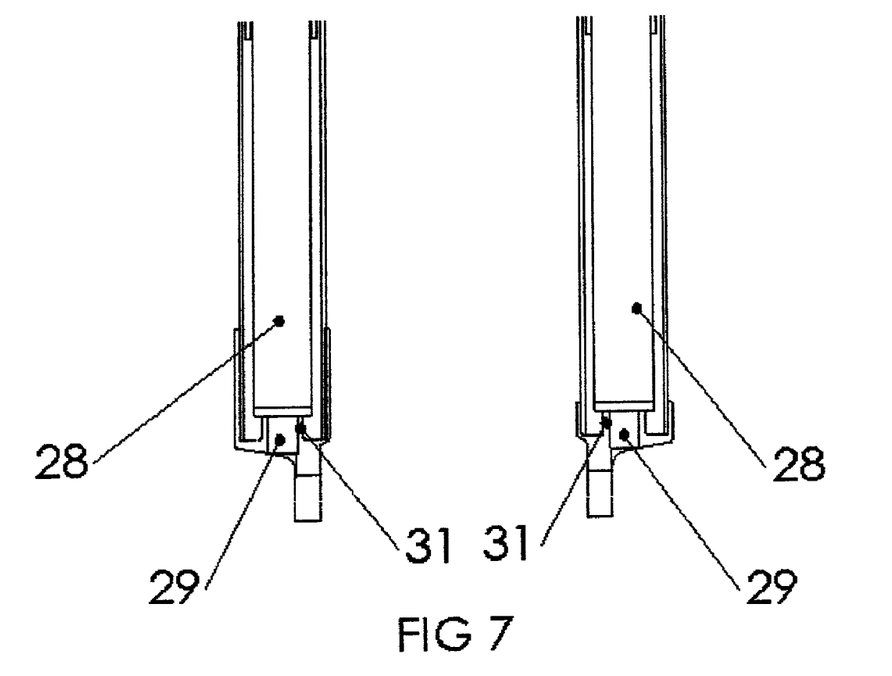
FIG. 7 illustrates the mounting provisions for the attaching the spring and damper assemblies to the right and left dropouts.

FIG. 7 shows the attachment of the damper assembly 15 and spring assembly 17 to the fork assembly 21 right and left dropouts 13–14. The damper spring body extension 29 has a threaded protrusion, which threadably mounts within internally threaded holes of the dropout mounting bosses 31 of the right dropout 13 and the left dropout 14. A shoulder on the on the damper/spring body extension 29 contacts and stops against the upper face of the dropout mounting bosses 31 in the right and left dropouts 13–14. It is seen now that as the fork assembly 21 telescopes, the damper assembly 15 and the spring assembly 17 will telescope correspondingly.

Figure 11:
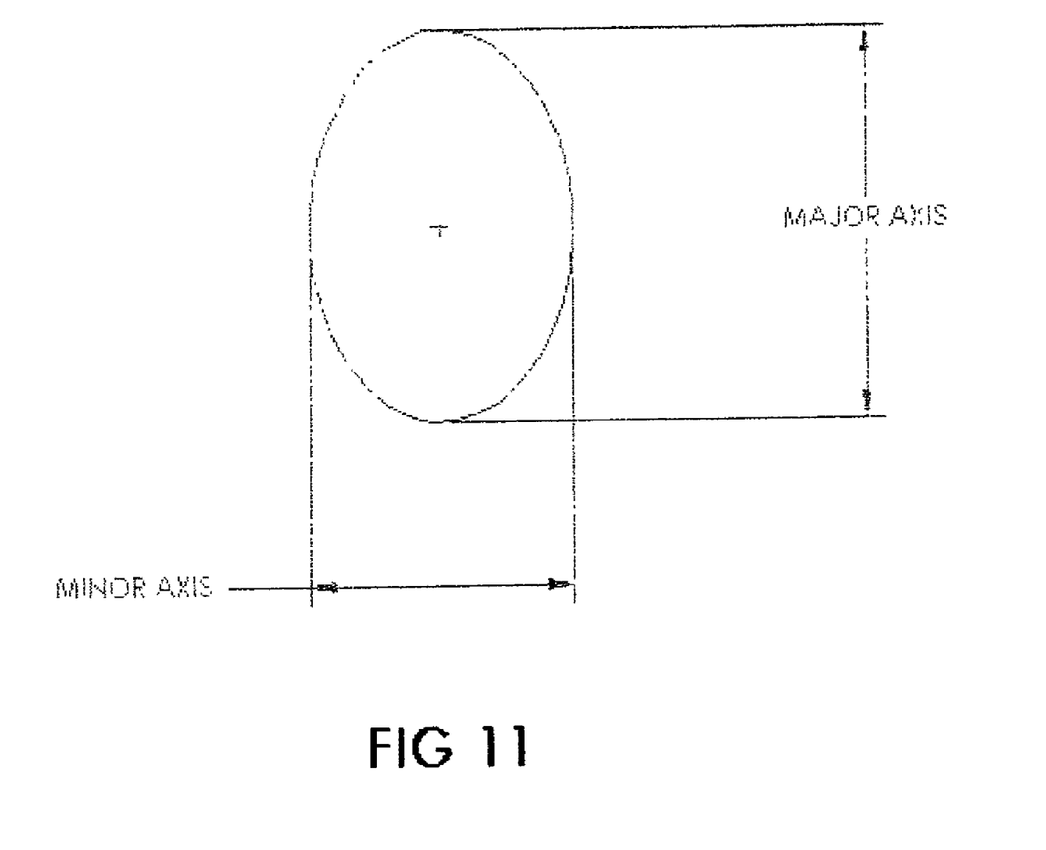
FIG. 11 defines the terms used to measure ellipses.
Figure 12:
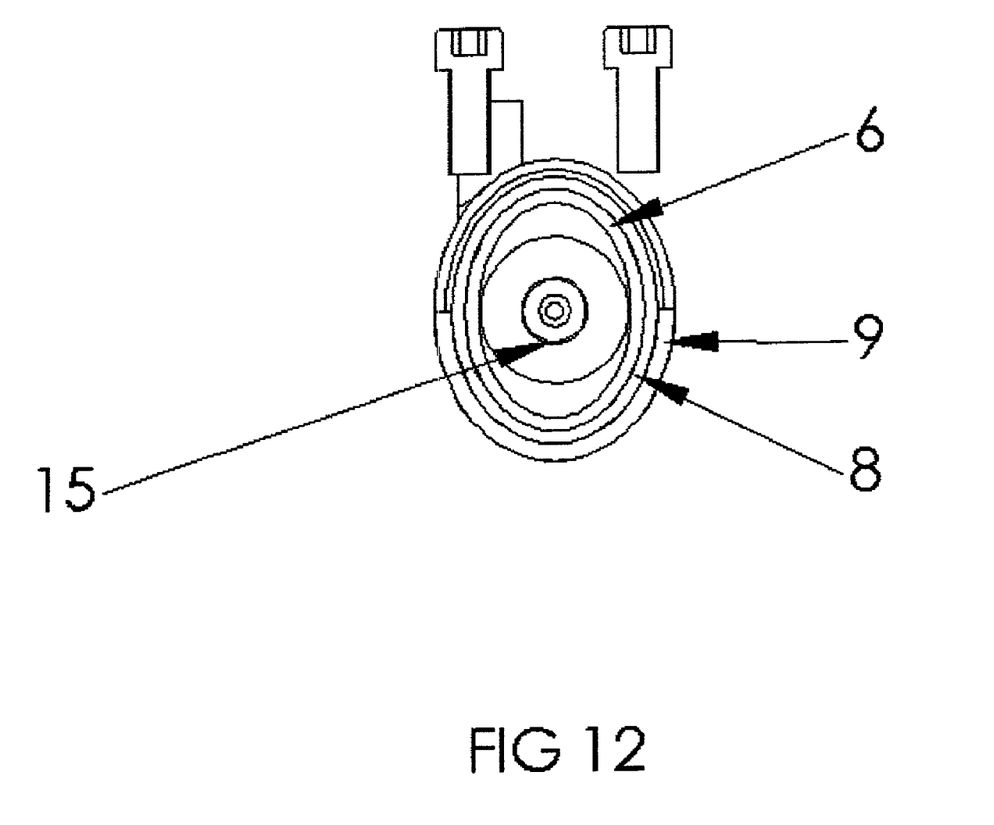
FIG. 12 provides a cross section view through the fork assembly at the location of the upper bushings.

Ellipses are measured in terms of a major axis and a minor axis as shown in FIG. 11. The ranges of these dimensions for use on a bicycle will be approximately:

Major Axis: 1.375–2.000 inches
Minor Axis: 1.000–1.500 inches

Defining an approximate aspect ratio between the major and minor axes of seventy percent. The length of stanchion tubes 6 is approximately 10.050 inches for disclosed design, which provides approximately three inches of suspension travel. A range of lengths for stanchion tube 6, depending on application and for a single fork crown design, is 8.000–12.500 inches. The length of slider tubes 10 is approximately 10.625 inches for the disclosed design. A range of lengths for the slider tubes 10 is 8.000–12.500 inches.

The steer tube 4, crown 5, stanchions 6, bushing carriers 9, sliders 10, dropouts 13–14, and fork bridge 11, are made out structural aluminum. It is important to note that any one, combination, or all of these components could successfully be made from steel, magnesium, carbon fiber composite or metal matrix composite as long as the part was designed to be structurally sound given the specific material properties for the intended material.

Further, the right and left slider assemblies 22–23, and the fork bridge 11 could be combined into one integral casting or molded part. This embodiment has described these parts as separate for ease of prototyping and short run production.

What is claimed is:

1. A telescopic front suspension for use with vehicles having a single front wheel comprising
   a steering tube adapted to be mounted in a head tube of a frame of the vehicle and connected to stem and handle bar above the head tube and to a fork crown below the head tube for steering the vehicle;
   a pair of stanchion tubes spaced apart and extending downwardly in parallel with each other having an elongated shape with upper ends attached to the fork crown and lower ends which slide axially and telescopically inside of a corresponding pair of slider tubes having an elongated hollow shape with upper ends which receive the stanchion tubes therein and lower ends mounted on respective sides of an axle for the front wheel,
   wherein the outer shape of the stanchion tubes and inner shape of the slider tubes have matching cross-sectional shapes that are non-round, smooth curves so as to allow them to freely telescope relative to each other while preventing rotation between the parts, resulting in more precise steering control for the rider, and
   further comprising an external bushing mounted on each one of the upper ends of the slider tubes having an inner shape matching the outer shape of the stanchion tubes, and an internal bushing mounted to each of the lower ends of the stanchion tubes having an outer shape matching the inner shape of the slider tubes, wherein the two-bushing arrangement allows the distance between the upper bushing and lower bushing to increase as the stanchion tube is telescopically displaced inside the slider tube, wherein the external bushing has a bushing carrier that is mounted over the upper end of the slider tube and wherein the bushing carriers mounted on the upper ends of the two slider tubes have bosses provided with mounting holes for mounting a fork bridge to the slider assemblies.

2. A telescopic front suspension system according to claim 1, wherein the cross-sectional shape of the stanchion tubes and slider tubes is an ellipse.

3. A telescopic front suspension system according to claim 2, wherein the stanchion tubes and slider tubes are dimensioned for use on a bicycle, and the elliptical shape is dimensioned with its major axis in the range of 1.375 to 2.0 inches, and its minor axis in the range of 1.0 to 1.5 inches.

4. A telescopic front suspension system according to claim 2, wherein the stanchion tubes and slider tubes are dimensioned for use on a bicycle, and the elliptical shape is dimensioned with an aspect ratio between major and minor axes of about seventy (70) percent.

5. A telescopic front suspension system according to claim 2, wherein the stanchion tubes and slider tubes are dimensioned for use on a bicycle, and the stanchion tubes have a length in the range of 8 to 12.5 inches and provide approximately 3 inches of suspension travel.

6. A telescopic front suspension system according to claim 1, wherein the external bushing has a first internal profile for mounting with an interference-fit on the upper end of the slider tube.

7. A telescopic front suspension system according to claim 1, wherein the external bushing has a second internal profile which provides a gap in the range of 0.0005 to 0.0035 inches from the outer surface of the stanchion tube.

8. A telescopic front suspension system according to claim 1, wherein the external bushing has a third internal profile for mounting a wiper seal to cover the upper end of the slider tube.

9. A telescopic front suspension system according to claim 1, wherein the internal bushing has a first internal profile for mounting with an interference-fit on the lower end of the stanchion tube.

10. A telescopic front suspension system according to claim 1, wherein the internal bushing has a second external profile which provides a gap in the range of 0.0005 to 0.0035 inches from the inner surface of the slider tube.

11. A telescopic front suspension system according to claim 1, further comprising a spring and damper assembly mounted within each pair of telescoping stanchion and slider tubes.

12. A telescopic suspension unit according to claim 1, further comprising an external bushing mounted on the upper end of the slider tube having an inner shape matching the outer shape of the stanchion tube, and an internal bushing mounted to the lower end of the stanchion tube having an outer shape matching the inner shape of the slider tube, wherein the two-bushing arrangement allows the distance between the upper bushing and lower bushing to increase as the stanchion tube is telescopically displaced inside the slider tube.

13. A telescopic suspension unit according to claim 12, wherein the external bushing has a first internal profile for mounting with an interference-fit on the upper end of the slider tube.

14. A telescopic suspension unit according to claim 12, wherein the internal bushing has a first internal profile for mounting with an interference-fit on the lower end of the stanchion tube.

* * * * *